UNITED STATES PATENT OFFICE.

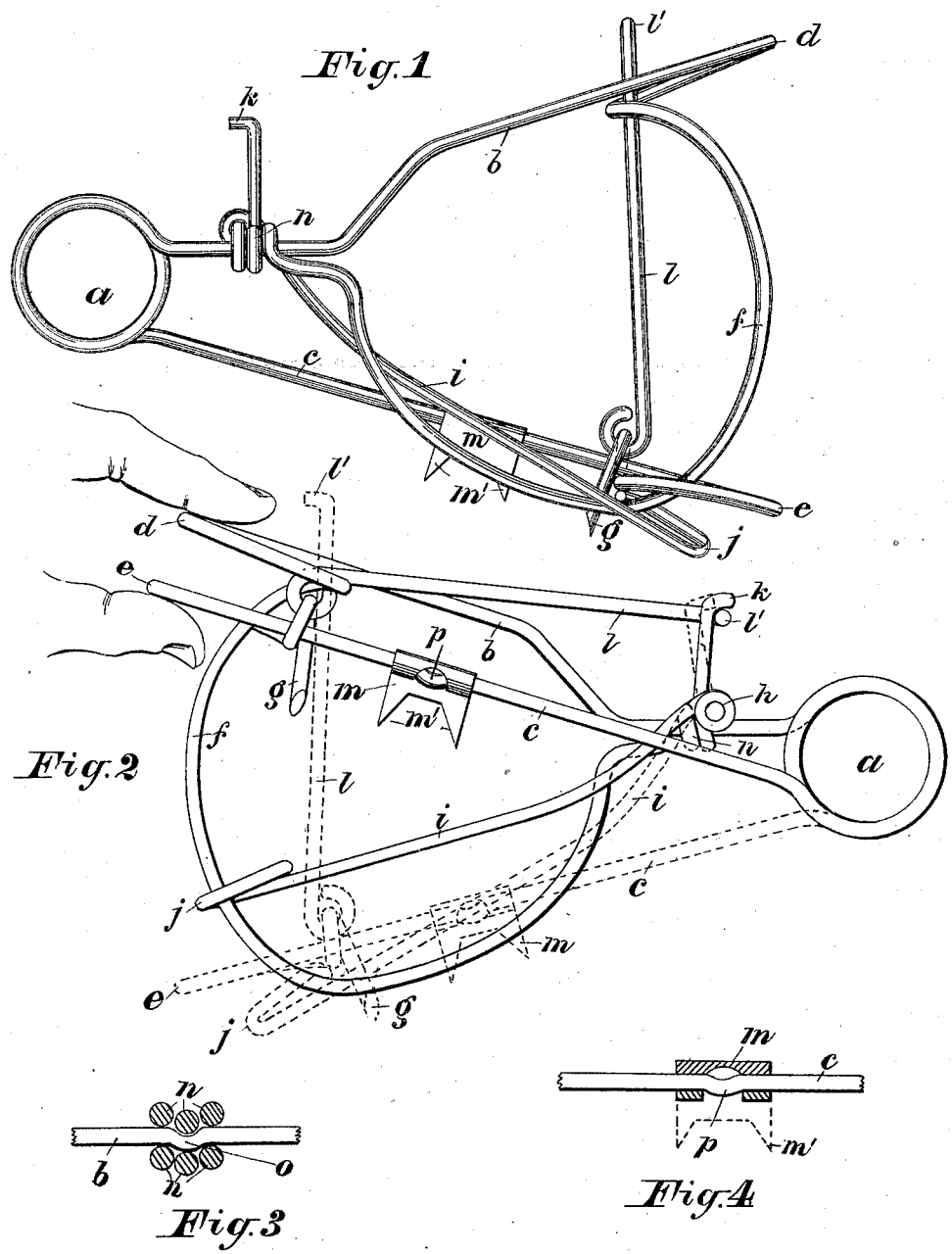

ELIJAH P. PEACOCK, OF CHICAGO, ILLINOIS.

ANIMAL-TRAP.

SPECIFICATION forming part of Letters Patent No. 314,602, dated March 31, 1885.

Application filed November 16, 1883. (Model.)

*To all whom it may concern:*

Be it known that I, ELIJAH P. PEACOCK, of Chicago, in the county of Cook and State of Illinois, have invented certain new and useful Improvements in Animal-Traps; and I hereby declare the following to be a full, clear, and exact description thereof, which will enable others skilled in the art to which my invention relates to make and use the same, reference being had to the accompanying drawings, forming a part hereof, and in which—

Figure 1 represents a rear and Fig. 2 a front view of my trap in elevation, the latter view as set. Fig. 3 shows a part of the arm $b$, with the knot $n$ in section. Fig. 4 shows a part of the arm $c$, with the blade $m$ in section and its spurs $m'$ in dotted outline.

Like letters of reference indicate like parts.

The object of my invention is to improve the construction of the trap for which a patent was granted April 10, 1883, No. 275,786; and it consists in appliances whereby the trap may be easily set without endangering the person's hands in setting it; also, in constructing the trigger so that it will keep its proper place and cause the trap to be more sensitive; also, in providing the striking-arm of the trap with extra prongs fastened in a particular manner; and, also, in fastening the long end of the arm $b$ and fulcrum $h$ in such a way as to hold it secure in its position.

In the drawings, $b$ represents the long and $c$ the short arm of a wire coiled into a spring, $a$. Said wire $b$ is bent into a large loop, $f$, and a small loop, $d$. Said loop $d$ is in the form of a long narrow slot, in which the lever $l$ plays and extends beyond the loop $f$, so as to form an ear or handle, and the outer end of the wire $b$ is brought around and back to near the spring $a$, where it is wound around the short straight part of itself, so as to form a knot, $n$, of nearly three coils, of which the center one rests in a bend, $o$, made in the wire $b$, and its free end $h$ projects from said arm $b$ in a vertical direction to the plane of the loop $f$ when the latter is horizontal. The arm $c$ extends in a straight line from the spring $a$ in front of the loop $f$, as shown in Fig. 2, and its outer end is formed into a loop, $e$, extending beyond the loop $f$ about the same distance as the loop $d$, and is shaped like it. These two loops or ears $d$ and $e$ form handles, by which the arm $c$ of the trap is raised to set, as shown in Fig. 2. The loop $e$ is closed upon the main wire $c$, and its free end wound around it so as to leave a loop, in which the eye of the lever $l$ plays, and also so as to form a free end or spur, $g$, which is cut on a bevel, so as to form a sharp prong. Near the center of the loop $f$ the arm $c$ is bent into a notch, $p$, upon which is attached a plate or piece of sheet metal, $m$, notched so as to form two arms, which are wound around the wire $c$, one on each side of the notch $p$. These parts so constructed hold said plate with its two free prongs $m'$, so that they cannot move away or turn, and are pointed in the same direction as the spur $g$. The lever $i$ plays on the fulcrum $h$ in the plane of the loop $f$ between the arms $b$ $c$, and from said fulcrum projects its short end about at right angles to the straight part of the arm $b$, and in a parallel plane with that of the plane of the loop $f$, and is provided with the hook $k$, pointing toward the spring $a$, and its other end is formed into a long and narrow loop encircling the wire on loop $f$. The lever or trigger $i$ is bent between the loop $j$ and fulcrum $h$, so as to be in a position, as shown in Fig. 1, relative to the other parts. The knot $n$ holds the fulcrum $h$ firmly in place, which thereby secures the nice adjustment and proper working of the parts $i$ $k$ $l'$, and the barbs $m'$ make the trap more efficient. The lever $l$ works in the slot of the loop $d$, and is shown in both the set and spring positions of the trap. The lever $i$ has a loop, $j$, encircling the loop $f$, which keeps it in its place laterally, and thereby prevents it from cramping on the fulcrum $h$.

What I claim is—

1. In an animal-trap having spring $a$, loop $f$, arms $b$ $c$, and trigger, and whereof the arm $c$ is provided with handle $e$, the handle $d$, substantially as specified.

2. An animal-trap formed of the arms $b$ $c$, loop $f$, and lever $l$, in combination with lever $i$, fulcrumed at $h$, and provided with hook $k$ and loop $j$, surrounding the wire of loop $f$, substantially as specified.

3. An animal-trap formed of the spring $a$ and arm $b$, formed into loops $d$ and $f$, in combination with the arm $c$, having bend $p$, and plate provided with spurs $m'$, substantially as specified.

4. An animal-trap formed of the spring $a$ and arm $b$, formed into the loops $d$ and $f$, in combination with the arm $c$, having bend $p$, spur $g$, loop $e$, and plate $m$, provided with spurs $m'$, substantially as specified.

5. In an animal-trap formed of a spring, $a$, and arms $b$ and $c$, the arm $b$ provided with a bend, $o$, and beyond it bent into a loop, $f$, the outer end of which is wound around said arm and bend $o$, so as to form a knot, $n$, substantially as specified.

ELIJAH P. PEACOCK.

Witnesses:
WM. ZIMMERMAN,
H. A. STAPLES.